US011139761B2

(12) United States Patent
Abe et al.

(10) Patent No.: US 11,139,761 B2
(45) Date of Patent: Oct. 5, 2021

(54) CONTROL APPARATUS AND MOTOR

(71) Applicant: NIDEC SERVO CORPORATION, Kiryu (JP)

(72) Inventors: Keiichi Abe, Kiryu (JP); Koji Harada, Kiryu (JP); Huafei Cai, Kiryu (JP); Masashi Nagumo, Kiryu (JP); Takayuki Suematsu, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 53 days.

(21) Appl. No.: 16/678,069

(22) Filed: Nov. 8, 2019

(65) Prior Publication Data

US 2020/0195174 A1   Jun. 18, 2020

(30) Foreign Application Priority Data

Dec. 13, 2018 (JP) .............................. JP2018-233567

(51) Int. Cl.
*H02M 1/42* (2007.01)
*H02P 6/08* (2016.01)
*H02P 4/00* (2006.01)
*H02P 27/06* (2006.01)

(52) U.S. Cl.
CPC ................. *H02P 6/08* (2013.01); *H02P 4/00* (2013.01); *H02P 27/06* (2013.01)

(58) Field of Classification Search
CPC .. H02P 6/08; H02P 4/00; H02P 27/06; H02M 1/4208
See application file for complete search history.

(56) References Cited

U.S. PATENT DOCUMENTS 6,181,583 B1 * 1/2001 Okui ................... H02M 1/4208
363/45

FOREIGN PATENT DOCUMENTS

JP          2002-223581 A     8/2002

* cited by examiner

*Primary Examiner* — Cortez M Cook
(74) *Attorney, Agent, or Firm* — Keating & Bennett, LLP

(57) ABSTRACT

A control apparatus includes a controller that controls a motor, a first transmission channel connected to a first power-supply terminal of an alternating-current source that supplies an alternating-current voltage, a second transmission channel connected to a second power-supply terminal of the alternating-current source, and a third transmission channel connected to each of the first transmission channel and the second transmission channel. The controller switches the rotational speed of the motor based on the voltage value of a signal input to the controller in accordance with a first connection status of the first transmission channel and the third transmission channel and a second connection status of the second transmission channel and the third transmission channel.

13 Claims, 3 Drawing Sheets

CONTROL APPARATUS AND MOTOR

CROSS REFERENCE TO RELATED APPLICATION

The present application claims priority under 35 U.S.C. § 119 to Japanese Application No. 2018-233567 filed on Dec. 13, 2018, the entire contents of which are hereby incorporated herein by reference.

1. Field of the Invention

The present disclosure relates to a control apparatus and a motor.

2. Background

Techniques for controlling motors have been researched and developed.

A known technique in the related art provides an apparatus capable of switching the rotation speed of a motor.

A known apparatus for controlling a motor to switch the rotation speed of the motor may include a plurality of control wires for use in switching the rotation speed of the motor in addition to two power wires for supplying alternating-current power to the apparatus. Such an apparatus including a plurality of control wires may require higher manufacturing cost than an apparatus without a plurality of control wires.

SUMMARY

A control apparatus according to a first example embodiment of the present disclosure includes a controller that controls a motor main body, a first transmission channel connected to a first power-supply terminal of an alternating-current source that supplies an alternating-current voltage, a second transmission channel connected to a second power-supply terminal of the alternating-current source, and a third transmission channel connected to each of the first transmission channel and the second transmission channel. The controller switches a rotational speed of the motor main body based on a voltage value of a signal input to the controller in accordance with a first connection status of the first transmission channel and the third transmission channel and a second connection status of the second transmission channel and the third transmission channel.

A motor according to a second example embodiment of the present disclosure includes a motor main body and a control apparatus. The control apparatus includes a controller that controls the motor main body, a first transmission channel connected to a first power-supply terminal of an alternating-current source that supplies an alternating-current voltage, a second transmission channel connected to a second power-supply terminal of the alternating-current source, and a third transmission channel connected to each of the first transmission channel and the second transmission channel. The controller switches a rotational speed of the motor main body based on a voltage value of a signal input to the controller in accordance with a first connection status of the first transmission channel and the third transmission channel and a second connection status of the second transmission channel and the third transmission channel.

The above and other elements, features, steps, characteristics and advantages of the present disclosure will become more apparent from the following detailed description of the preferred example embodiments with reference to the attached drawings.

DETAILED DESCRIPTION

Example embodiments of the present disclosure will be described hereinbelow with reference to the drawings. In the present example embodiments, a conductor that transmits an electrical signal is referred to as a "transmission channel". The transmission channel may be either a conductor printed on a substrate or a wire, such as a linear conductor.

Figure 1:
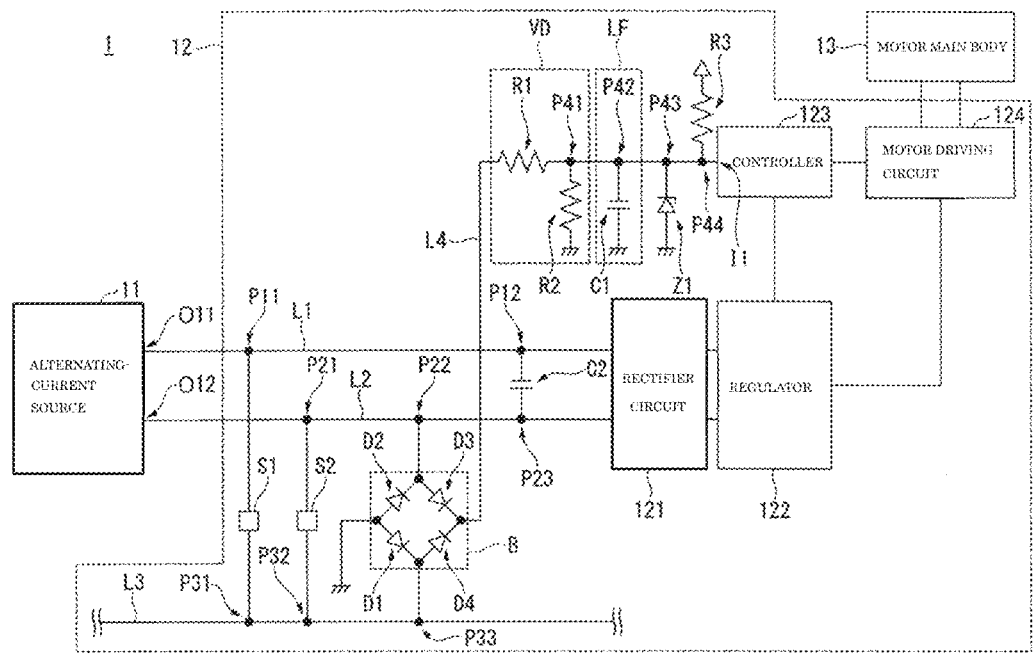
FIG. 1 is a diagram illustrating an example of the configuration of a motor 1 according an example embodiment of the present disclosure.

FIG. 1 is a diagram of an example of the configuration of a motor 1 according an example embodiment and illustrates an example of the motor 1 and a motor control system. The motor 1 includes a control apparatus 12 to which an alternating-current voltage is supplied from an alternating-current source 11 and a motor main body 13. The motor 1 is a motor in which the rotational speed of the motor main body 13 can be switched by the control of the control apparatus 12. The rotational speed of the motor main body 13 is the angular velocity of the output shaft of the motor main body 13. The rotational speed of the motor main body 13 may be hereinafter referred to as "the rotational speed of the motor 1" for the convenience of description. The motor 1 may include the alternating-current source 11.

For example, the motor 1 is used to compress a refrigerant in a compressor of a cooling system. In this case, the motor 1 is installed in the cooling system after the rotational speed of the motor 1 is switched to a rotational speed suitable for the cooling system. The configuration of the motor 1 described hereinbelow is an example of a configuration for achieving switching of the rotational speed of the motor 1 performed in this case.

The alternating-current source 11 supplies an alternating-current voltage to the control apparatus 12. The alternating-current source 11 includes a first power-supply terminal O11 and a second power-supply terminal O12. The alternating-current source 11 applies an alternating-current voltage between the first power-supply terminal O11 and the second power-supply terminal O12.

The first power-supply terminal O11 is connected to a first transmission channel L1 of the control apparatus 12. In other words, the first transmission channel L1 is a transmission channel connected to the first power-supply terminal O11 of the alternating-current source 11 which supplies an alternating-current voltage.

The second power-supply terminal O12 is connected to a second transmission channel L2 of the control apparatus 12. In other words, the second transmission channel L2 is a transmission channel connected to the second power-supply terminal O12 of the alternating-current source 11 which supplies an alternating-current voltage.

The control apparatus 12 receives an alternating-current voltage from the alternating-current source 11. The control apparatus 12 controls the motor main body 13 in accordance with the supplied alternating-current voltage.

The control apparatus 12 includes the first transmission channel L1, the second transmission channel L2, and a third transmission channel L3. The control apparatus 12 further includes a first switching device S1, a second switching device S2, and a bridge circuit B. The control apparatus 12 further includes a rectifier circuit 121, a regulator 122, a controller 123, and a motor driving circuit 124. The control apparatus 12 further includes a resistor R1, a resistor R2, a resistor R3, a first capacitor C1, and a second capacitor C2.

The third transmission channel L3 is a transmission channel connected to the first transmission channel L1 and the second transmission channel L2 via transmission channels.

An example of the first switching device S1 is a field-effect transistor. The first switching device S1 is disposed on the transmission channel connecting the first transmission channel L1 and the third transmission channel L3. A node P11 illustrated in FIG. 1 is a node between the transmission channel and the first transmission channel L1. A node P31 illustrated in FIG. 1 is a node between the transmission channel and the third transmission channel L3.

The first switching device S1 changes a first connection status in accordance with the status of the first switching device S1. The first connection status is the connection status of the first transmission channel L1 and the third transmission channel L3. The first switching device S1 changes the first connection status to a first-third connection status or a first-third nonconnection status. The first-third connection status is a status in which the first transmission channel L1 and the third transmission channel L3 are connected. The first-third nonconnection status is a status in which the first transmission channel L1 and the third transmission channel L3 are not connected.

The status of the first switching device S1 is ON status or OFF status. When the first switching device S1 is in ON status, the source and the drain of the first switching device S1 is electrically connected. In other words, the first connection status in this case is the first-third connection status. When the first switching device S1 is in OFF status, the source and the drain of the first switching device S1 are not electrically connected. In other words, the first connection status in this case is the first-third nonconnection status.

The first switching device S1 may be another switching device, such as a bipolar transistor, instead of the field-effect transistor.

An example of the second switching device S2 is a field-effect transistor. The second switching device S2 is disposed on the transmission channel connecting the second transmission channel L2 and the third transmission channel L3. A node P21 illustrated in FIG. 1 is a node between the transmission channel and the first transmission channel L1. A node P32 illustrated in FIG. 1 is a node between the transmission channel and the third transmission channel L3.

The second switching device S2 changes the second connection status in accordance with the status of the second switching device S2. The second connection status is the connection status of the second transmission channel L2 and the third transmission channel L3. The second switching device S2 changes the second connection status to a second-third connection status or a second-third nonconnection status. The second-third connection status is a status in which the second transmission channel L2 and the third transmission channel L3 are connected. The second-third nonconnection status is a status in which the second transmission channel L2 and the third transmission channel L3 are not connected.

The status of the second switching device S2 is ON status or OFF status. When the second switching device S2 is in ON status, the source and the drain of the second switching device S2 are electrically connected. In other words, the second connection status in this case is the second-third connection status. When the second switching device S2 in OFF status, the source and the drain of the second switching device S2 are not electrically connected. In other words, the second connection status in this case is the second-third nonconnection status.

The second switching device S2 may be another switching device, such as a bipolar transistor, instead of the field-effect transistor.

The bridge circuit B includes a first rectifying device D1, a second rectifying device D2, a third rectifying device D3, and a fourth rectifying device D4.

The bridge circuit B is connected between the second transmission channel L2 and the third transmission channel L3. The bridge circuit B outputs, to the controller 123, a signal that is input to the controller 123 through a fourth transmission channel L4.

More specifically, the transmission channel connecting the first rectifying device D1 and the second rectifying device D2 is grounded through another transmission channel.

A transmission channel connecting the first rectifying device D1 and the fourth rectifying device D4 is connected to the third transmission channel L3 through another transmission channel. A node P33 illustrated in FIG. 1 is a node between the other transmission channel and the third transmission channel L3.

A transmission channel connecting the second rectifying device D2 and the third rectifying device D3 is connected to the second transmission channel L2 through another transmission channel. A node P22 illustrated in FIG. 1 is a node between the other transmission channel and the second transmission channel L2.

A transmission channel connecting the third rectifying device D3 and the fourth rectifying device D4 is connected to a signal input terminal I1 of the controller 123 through the fourth transmission channel L4.

The first rectifying device D1 allows a current to flow not to the second rectifying device D2 but toward the fourth rectifying device D4. The second rectifying device D2 allows a current to flow not to the first rectifying device D1 but toward the third rectifying device D3. The third rectifying device D3 allows a current to flow not to the second rectifying device D2 but toward the fourth rectifying device D4. The fourth rectifying device D4 allows a current to flow not to the first rectifying device D1 but toward the third rectifying device D3.

An example of the first rectifying device D1, the second rectifying device D2, the third rectifying device D3, and the fourth rectifying device D4 is a diode. At least one of the first rectifying device D1, the second rectifying device D2, the third rectifying device D3, and the fourth rectifying device D4 may be another device. The other device is a device that can function as a rectifying device by switching, such as a field-effect transistor.

Such bridge circuit B outputs three signals with mutually different waveforms to the controller 123 through the fourth transmission channel L4 in accordance with the first connection status and the second connection status. This allows the control apparatus 12 to switch the rotational speed of the motor main body 13 to a rotational speed associated with one of the three signals in accordance with the first connection status and the second connection status. In other words, the control apparatus 12 can switch the rotational speed of the motor main body 13 to one of the three mutually different rotational speeds.

The control apparatus 12 may include another circuit instead of the bridge circuit B. The other circuit is a circuit capable of outputting one of four or more signals with mutually different waveforms to the controller 123 in accordance with the first connection status and the second connection status. In this case, the control apparatus 12 can switch the rotational speed of the motor main body 13 to one of the four mutually different rotational speeds.

The resistor R1 is disposed on the fourth transmission channel L4. A position on the fourth transmission channel L4 nearer to the controller 123 than the resistor R1 is connected to one of the terminals of the resistor R2 through a transmission channel. A node P41 illustrated in FIG. 1 is a node between the transmission channel and the fourth transmission channel L4. The other of the terminals of the resistor R2 is grounded.

The resistor R1 and the resistor R2 constitute a voltage-dividing circuit VD in the control apparatus 12. In other words, the control apparatus 12 includes the voltage-dividing circuit VD. The voltage-dividing circuit VD may have a configuration different from the configuration illustrated in FIG. 1. The control apparatus 12 may not include the voltage-dividing circuit VD. In other words, the control apparatus 12 may not include the resistor R1 and the resistor R2.

Such voltage-dividing circuit VD is a circuit that divides the voltage value of a signal input to the controller 123 through the fourth transmission channel L4 so that the controller 123 is able to read the voltage value of the signal through the signal input terminal I1 provided as a microcomputer port of the controller 123. This eliminates the need for the control apparatus 12 to include a step-down circuit for lowering the alternating-current voltage supplied from the alternating-current source 11. This allows the control apparatus 12 to suppress an increase in the manufacturing cost as compared with a case including the step-down circuit. The resistance of the resistor R1 is, for example, 800 kΩ, but may be lower than or higher than 800 kΩ. The resistance of the resistor R2 is, for example, 20 kΩ, but may be lower than or higher than 20 kΩ.

An example of the first capacitor C1 is an electrolytic capacitor. The first capacitor C1 is a smoothing capacitor that smooths a signal input to the controller 123 through the fourth transmission channel L4. The first capacitor C1 may be another capacitor, such as a ceramic capacitor, instead of the electrolytic capacitor. One of the terminals of the first capacitor C1 is connected, through a transmission channel, to a position on the fourth transmission channel L4 nearer to the controller 123 than the node P41. A node P42 illustrated in FIG. 1 is a node between the transmission channel and the fourth transmission channel L4. The other of the terminals of the first capacitor C1 is grounded.

The first capacitor C1 constitutes a low-pass filter LF in the control apparatus 12. In other words, the control apparatus 12 includes the low-pass filter LF. The capacitance of the first capacitor C1 is, for example, 33 μF, but may be smaller or larger than 33 μF. The low-pass filter LF may have a configuration different from the configuration illustrated in FIG. 1. The control apparatus 12 may not include the low-pass filter LF. In other words, the control apparatus 12 may not include the first capacitor C1.

Such low-pass filter LF smooths a signal input to the controller 123 through the fourth transmission channel L4. The voltage value of the thus-smoothed signal is substantially constant. Therefore, the three signals with mutually different waveforms flowing through the fourth transmission channel L4 are each smoothed into signals with mutually different voltage values that can be distinguished by the controller 123. This allows the control apparatus 12 to switch the rotational speed of the motor main body 13 to any one of the three mutually different rotational speeds without detecting the waveforms of the three signals. The control apparatus 12 may not include the low-pass filter LF. In this case, the control apparatus 12 uses a time integral value per unit time of the voltage value of each of the three signals, instead of the voltage value of each of the three smoothed signals. The unit time may be any period of time as long as the unit time is a predetermined time.

The cathode of a Zener diode Z1 is connected, through a transmission channel, to a position on the fourth transmission channel L4 nearer to the controller 123 than the node P42. A node P43 illustrated in FIG. 1 is a node between the transmission channel and the fourth transmission channel L4. The anode of the Zener diode Z1 is grounded.

One of the terminals of the resistor R3 is connected, through a transmission channel, to a position on the fourth transmission channel L4 nearer to the controller 123 than the node P43. A node P44 illustrated in FIG. 1 is a node of the transmission channel and the fourth transmission channel L4. The other of the terminals of the resistor R3 is connected to a power source. In other words, the resistor R3 is a pull-up resistor.

An example of the second capacitor C2 is an electrolytic capacitor. The second capacitor C2 may be another capacitor, such as a ceramic capacitor, instead of the electrolytic capacitor. One of the terminals of the second capacitor C2 is connected to a position on the first transmission channel L1 nearer to the control apparatus 12 than the node P11. A node P12 illustrated in FIG. 1 is the node between the transmission channel and the first transmission channel L1. The other of the terminals of the second capacitor C2 is connected to a position on the second transmission channel L2 nearer to the control apparatus 12 than the node P22. A node P23 illustrated in FIG. 1 is the node between the transmission channel and the second transmission channel L2.

The rectifier circuit 121 rectifies an alternating-current voltage supplied from the alternating-current source 11 to a direct-current voltage. The rectifier circuit 121 includes a first input terminal (not illustrated) and a second input terminal (not illustrated). The first input terminal of the rectifier circuit 121 is connected to the first power-supply terminal O11 of the alternating-current source 11 through the first transmission channel L1. The second input terminal of the rectifier circuit 121 is connected to the second power-supply terminal O12 of the alternating-current source 11 through the second transmission channel L2. This allows the rectifier circuit 121 to receive an alternating-current voltage from the alternating-current source 11.

The rectifier circuit 121 includes a first output terminal on a positive side and a second output terminal on a negative side. The first output terminal of the rectifier circuit 121 is connected to a first input terminal of the regulator 122 through a transmission channel. The first input terminal of the regulator 122 is a positive input terminal. The second output terminal of the rectifier circuit 121 is connected to a second input terminal of the regulator 122 through a transmission channel. The second input terminal of the regulator 122 is a negative input terminal.

The regulator 122 includes a first output terminal and a second output terminal. The first output terminal of the regulator 122 is connected to the power-supply terminal of the controller 123 through a transmission channel. The second output terminal of the regulator 122 is connected to the power-supply terminal of the motor driving circuit 124 through a transmission channel.

The regulator 122 generates a first voltage with a predetermined voltage value based on a direct-current voltage supplied from the rectifier circuit 121. The predetermined voltage value is lower than the value of the direct-current voltage. The predetermined voltage value is, for example, 5 V. The predetermined voltage value may be lower than or higher than 5 V. The regulator 122 supplies the generated first voltage from the first output terminal to the controller 123 through the transmission channel.

The regulator 122 generates a second voltage with a predetermined voltage value based on a direct-current voltage supplied from the rectifier circuit 121. The predetermined voltage is lower than the value of the direct-current voltage. The predetermined voltage value is higher than the value of the first voltage. In other words, the second voltage is lower than the first voltage. The predetermined voltage is, for example, 12 V. The predetermined voltage value may be a voltage value lower than 12 V among voltage values higher than the voltage value of the first voltage. The predetermined voltage value may be higher than 12 V. The regulator 122 supplies the generated second voltage from the second output terminal to the motor driving circuit 124 through the transmission channel.

An example of the controller 123 is a central processing unit (CPU). The controller 123 may be another processor, such as a field programmable gate array (FPGA).

The controller 123 includes the one signal input terminal I1, the power input terminal (not illustrated), and a signal output terminal (not illustrated). The signal input terminal I1 of the controller 123 is a terminal that receives an analog signal. The signal output terminal of the controller 123 is connected to a signal input terminal of the motor driving circuit 124 through a transmission channel. This allows the control apparatus 12 to switch the rotational speed of the motor main body 13 in accordance with the analog signal while suppressing an increase in the manufacturing cost.

The controller 123 controls a switching device (not illustrated) of the motor driving circuit 124 based on the first voltage supplied from the regulator 122 to drive the motor main body 13. The controller 123 drives the motor main body 13 at a rotational speed according to the first connection status and the second connection status. When at least one of the first connection status and the second connection status is switched, the controller 123 switches the rotational speed of the motor main body 13. Specifically, the controller 123 receives a signal according to the first connection status and the second connection status after being switched. The signal is a signal after being smoothed by the low-pass filter LF. The controller 123 switches the rotational speed of the motor main body 13 in accordance with the voltage value of the input signal. In the present example embodiment, the controller 123 switches the rotational speed of the motor main body 13 to one of the three predetermined rotational speeds in accordance with the voltage value of the input signal. The controller 123 may be configured to switch the rotational speed of the motor main body 13 to one of two predetermined rotational speeds in accordance with the voltage value of the signal input through the fourth transmission channel L4. The controller 123 may be configured to switch the rotational speed of the motor main body 13 to one of four or more predetermined rotational speeds in accordance with the voltage value of the input signal.

Thus, the control apparatus 12 switches the rotational speed of the motor main body 13 using the first transmission channel L1 and second transmission channel L2 for supplying an alternating-current voltage to the control apparatus 12, and the third transmission channel L3. This allows the control apparatus 12 to suppress an increase in the manufacturing cost as compared to a case where the rotational speed of the motor main body 13 is switched by using four or more transmission channels. As a result, the control apparatus 12 can control the rotational speed of the motor main body 13 while suppressing an increase in the manufacturing cost.

The motor driving circuit 124 includes a plurality of switching devices (not illustrated). The motor driving circuit 124 is connected to a coil of the motor main body 13 through a transmission channel. The motor driving circuit 124 drives the motor main body 13 based on the second voltage supplied from the regulator 122. The motor driving circuit 124 rotates the motor main body 13 at a rotational speed based on a signal input from the controller 123.

The motor main body 13 is driven by the motor driving circuit 124.

The waveform of a signal input to the controller 123 in the control apparatus 12 will be described hereinbelow.

In the control apparatus 12, the waveform of the signal input to the controller 123 is one of three waveforms according to the first connection status and the second connection status.

A case in which the first connection status is the first-third connection status and in which the second connection status is the second-third nonconnection status is hereinafter referred to as a first case for the convenience of description. A case in which the first connection status is the first-third nonconnection status and in which the second connection status is the second-third nonconnection status is hereinafter referred to as a second case for the convenience of description. A case in which the first connection status is the first-third nonconnection status and in which the second connection status is the second-third connection status is referred to as a third case for the convenience of description.

Figure 2:
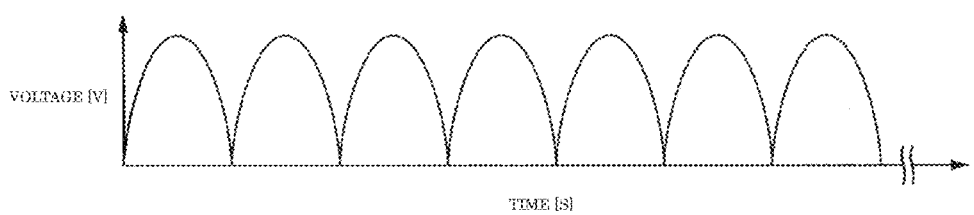
FIG. 2 illustrates an example of a first waveform of an example embodiment of the present disclosure.

In the first case, the first switching device S1 is in ON status. In the first case, the second switching device S2 is in OFF status. Therefore, when the potential of the first transmission channel L1 is higher than the potential of the second transmission channel L2 in the first case, a current flows to the fourth transmission channel L4 through the first transmission channel L1 and the fourth rectifying device D4. In contrast, when the potential of the second transmission channel L2 is higher than the potential of the first transmission channel L1 in the first case, a current flows to the fourth transmission channel L4 through the second transmission channel L2 and the third rectifying device D3. As a result, the waveform of the signal input to the controller 123 through the fourth transmission channel L4 in the first case matches a first waveform illustrated in FIG. 2. FIG. 2 illustrates an example of the first waveform. The first waveform illustrated in FIG. 2 is the waveform of a voltage obtained after full-wave rectifying an alternating-current voltage supplied from the alternating-current source 11.

Figure 3:
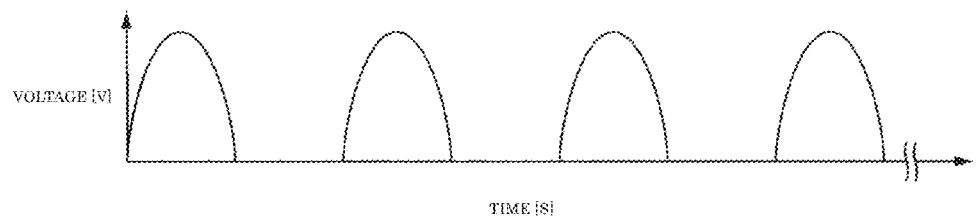
FIG. 3 illustrates an example of a second waveform of an example embodiment of the present disclosure.

In the second case, the first switching device S1 is in OFF status. In the second case, the second switching device S2 is in OFF status. Therefore, when the potential of the first transmission channel L1 is higher than the potential of the second transmission channel L2 in the second case, no current flows through the fourth transmission channel L4. In contrast, when the potential of the second transmission channel L2 is higher than the potential of the first transmission channel L1 in the second case, a current flows to the fourth transmission channel L4 through the second transmission channel L2 and the third rectifying device D3. As a result, the waveform of a signal input to the controller 123 through the fourth transmission channel L4 in the second case matches a second waveform illustrated in FIG. 3. FIG. 3 illustrates an example of the second waveform. The second waveform illustrated in FIG. 3 is the waveform of a voltage obtained by half-wave rectifying an alternating-current voltage supplied from the alternating-current source 11.

Figure 4:
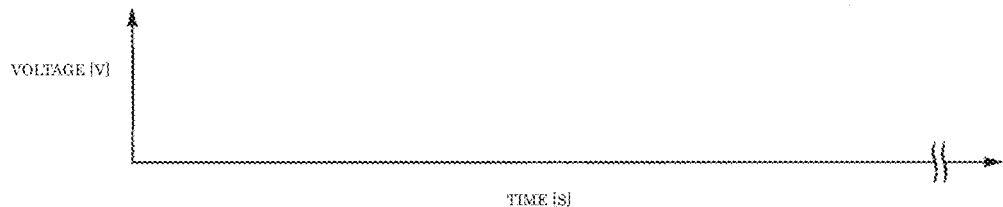
FIG. 4 illustrates an example of a third waveform of an example embodiment of the present disclosure.

In the third case, the first switching device S1 is in OFF status. In the third case, the second switching device S2 is in ON status. Therefore, in the third case, no current flows through the fourth transmission channel L4. As a result, the waveform of the signal input to the controller 123 through the fourth transmission channel L4 in the third case matches a third waveform illustrated in FIG. 4. FIG. 4 illustrates an example of the third waveform. The third waveform illustrated in FIG. 4 is the waveform of a voltage when the voltage value is constantly 0.

Figure 5:
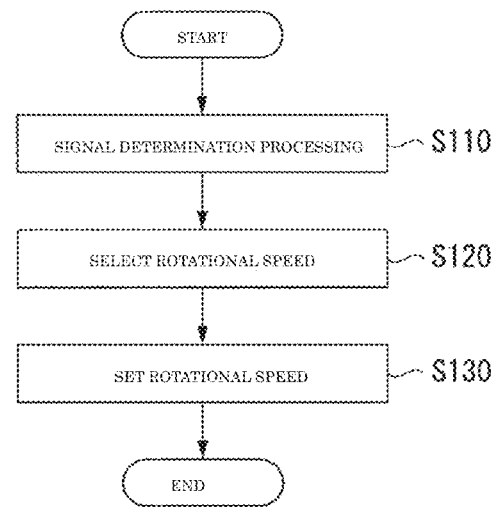
FIG. 5 is a flowchart illustrating an example of a processing procedure of a controller 123 of a control apparatus 12 to switch the rotational speed of a motor main body 13 according to an example embodiment of the present disclosure.

Referring to FIG. 5, processing for switching the rotational speed of the motor main body 13 performed by the controller 123 of the control apparatus 12 will be described. FIG. 5 is a flowchart illustrating an example of a processing procedure for the controller 123 of the control apparatus 12 to switch the rotational speed of the motor main body 13. The control apparatus 12 performs the processing of the flowchart illustrated in FIG. 5 at the start of supply of an alternating-current voltage from the alternating-current source 11. More specifically, the control apparatus 12 performs the processing when the control apparatus 12 is installed for the motor main body 13.

The following description is about a case in which a signal output from the bridge circuit B is input to the controller 123 at a timing before the processing of step S110. Hereinafter, among the signals input to the signal input terminal I1 of the controller 123, a signal with the first waveform is referred to as a "first signal" for the convenience of description. Among the signals input to the signal input terminal I1 of the controller 123, a signal with the second waveform is hereinafter referred to as a "second signal" for the convenience of description. Among the signals input to the signal input terminal I1 of the controller 123, a signal with the third waveform is hereinafter referred to as a "third signal" for the convenience of description.

The controller 123 performs signal determination processing (step S110). The signal determination processing is processing for determining which of the first to third signals the signal input to the signal input terminal I1 is.

Specifically, if the voltage value of the signal input to the signal input terminal I1 is a predetermined first threshold or greater, then the controller 123 determines that the signal is the first signal. The first threshold is a threshold determined based on the first signal. If the voltage value is less than the first threshold and equal to or greater than a predetermined second threshold, the controller 123 determines that the signal is the second signal. The second threshold is lower than the first threshold. The second threshold is a threshold determined based on the second signal. If the voltage value is less than the predetermined second threshold, the controller 123 determines that the signal is the third signal.

The controller 123 may be configured, if the voltage value of the signal input to the signal input terminal I1 is within the range of the predetermined first voltage, to determine that the signal is the first signal. In this case, if the voltage value is within the range of the predetermined second voltage, the controller 123 determines that the signal is the second signal. In this case, if the voltage value is out of the range of the first voltage and within the range of the second voltage, the controller 123 determines that the signal is the third signal. The first voltage range is determined based on the first signal. The second voltage range is a voltage range in which the central value is lower than the central value of the first voltage range. The second voltage range does not overlap the first voltage range.

The controller 123 may also be configured to determine which of the first to third signals the signal is, using another method, such as detecting the waveform of the signal input to the signal input terminal I1.

After the processing of step S110, the controller 123 selects a rotational speed from the stored three rotational speeds in accordance with the result of the signal determination processing (step S120). The three rotational speeds include a rotational speed associated with the first signal, a rotational speed associated with the second signal, and a rotational speed associated with the third signal. If the signal input to the signal input terminal I1 is determined to be the first signal, then the controller 123 selects the rotational speed associated with the first signal. If it is determined that the signal is the second signal, the controller 123 selects the rotational speed associated with the second signal. If it is determined that the signal is the third signal, the controller 123 selects the rotational speed associated with the third signal.

After the processing of step S120, the controller 123 sets the rotational speed selected in step S120 as the rotational speed of the motor main body 13 (step S130). Then, the controller 123 ends the processing of the flowchart illustrated in FIG. 5. Thereafter, the control apparatus 12 controls the motor driving circuit 124 to drive the motor main body 13 at the rotational speed set in this way.

In the control apparatus 12 described above, the first switching device S1 is set to a predetermined status at the installation of the control apparatus 12. In the control apparatus 12, the second switching device S2 is set to a predetermined status at the installation of the control apparatus 12. For this reason, the control apparatus 12 cannot change the rotational speed of the motor main body 13 after the control apparatus 12 is installed.

Accordingly, the control apparatus 12 may include a first operating unit for changing the status of the first switching device S1 after the control apparatus 12 is installed. The control apparatus 12 may include a second operating unit for changing the status of the second switching device S2 after the control apparatus 12 is installed. Examples of the first operating unit for changing the status of the first switching device S1 include, but are not limited to, a button and a lever. Examples of the second operating unit for changing the status of the second switching device S2 include, but are not limited to, a button and a lever. In this case, the controller 123 performs the processing of the flowchart illustrated in FIG. 5, for example, every time the voltage of the signal input to the controller 123 changes. This allows the control apparatus 12 to switch the rotational speed of the motor main body 13 even after the control apparatus 12 is installed while suppressing an increase in the manufacturing cost.

The control apparatus 12 may include a circuit for changing the status of the first switching device S1 depending on changes in the environment outside the control apparatus 12, such as the temperature and the season. The control apparatus 12 may include a circuit for changing the status of the second switching device S2 depending on the environmental changes. In this case, the controller 123 includes a detection unit for detecting, for example, a physical amount indicating the external environment. The controller 123 obtains information indicating the physical amount from, for example, another device. This allows the control apparatus 12 to switch the rotational speed of the motor main body 13 depending on the environmental changes while suppressing an increase in the manufacturing cost.

The control apparatus 12 may include a circuit for changing the waveform of the first signal input to the signal input terminal I1 of the controller 123 to another waveform. The control apparatus 12 may include a circuit for changing the waveform of the second signal input to the signal input terminal I1 of the controller 123 to another waveform. This allows the control apparatus 12 to switch the rotational speed of the motor main body 13 to one of four or more rotational speeds.

In the control apparatus 12, the voltage value of the first signal and the voltage value of the second signal may increase or decrease because of noise. This may cause the controller 123 to erroneously determine that the first signal is the second signal or determine that the second signal is the third signal in the signal determination processing. Therefore, the control apparatus 12 may include a Zener diode Z2 and a Zener diode Z3, as illustrated in FIG. 6.

Figure 6:
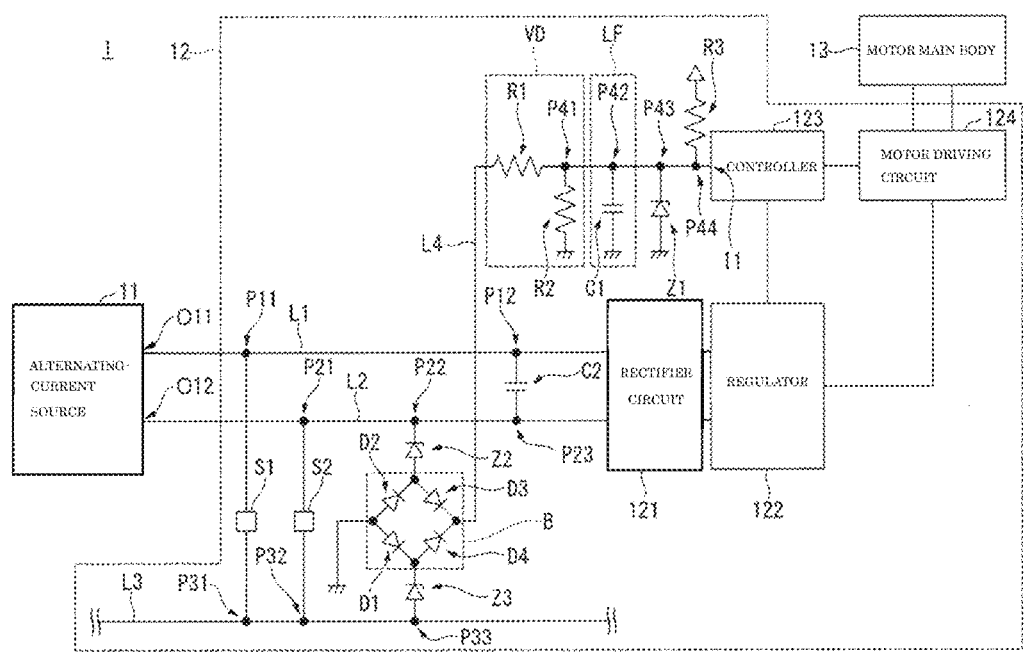
FIG. 6 is a diagram illustrating an example of the configuration of the control apparatus 12 including a Zener diode Z2 and a Zener diode Z3.

FIG. 6 is a diagram illustrating an example of the configuration of a control apparatus 12 including the Zener diode Z2 and the Zener diode Z3.

The Zener diode Z2 is disposed on the transmission channel connecting the second transmission channel L2 and the bridge circuit B. In other words, the Zener diode Z2 is connected between the second transmission channel L2 and the bridge circuit B. The anode of the Zener diode Z2 is connected to the bridge circuit B. The cathode of the Zener diode Z2 is connected to the second transmission channel L2.

The Zener diode Z3 is disposed on the transmission channel connecting the third transmission channel L3 and the bridge circuit B. In other words, the Zener diode Z3 is connected between the third transmission channel L3 and the bridge circuit B. The cathode of the Zener diode Z3 is connected to the bridge circuit B. The anode of the Zener diode Z3 is connected to the third transmission channel L3.

This increases the difference between the voltage value of the first signal and the voltage value of the second signal. This can suppress erroneous determination by the controller 123 that the first signal is the second signal even if each of the voltage values of the first signal and the second signal is increased or decreased because of noise. This can also suppress erroneous determination by the controller 123 that the second signal is the first signal even in that case. In other words, the controller 123 can distinguish between the voltage value of the first signal and the voltage value of the second signal more reliably.

In the above example, the control apparatus 12 and the motor main body 13 of the motor 1 are separate from each other. Alternatively, the control apparatus 12 and the motor main body 13 of the motor 1 may form an integrated unit. In the above example, the control apparatus 12 is separate from the alternating-current source 11. Alternatively, the control apparatus 12 may be integrated with the alternating-current source 11.

As described above, the control apparatus according to an example embodiment includes a controller configured to control a motor main body, a first transmission channel connected to a first power-supply terminal of an alternating-current source that supplies an alternating-current voltage, a second transmission channel connected to a second power-supply terminal of the alternating-current source, and a third transmission channel connected to each of the first transmission channel and the second transmission channel. The controller switches a rotational speed of the motor main body based on a voltage value of a signal input to the controller in accordance with a first connection status of the first transmission channel and the third transmission channel and a second connection status of the second transmission channel and the third transmission channel. Thus, the control apparatus is able to switch the rotational speed of the motor main body while suppressing an increase in the manufacturing cost.

The control apparatus may further include a bridge circuit connected between the second transmission channel and the third transmission channel and outputting the signal to the controller through a fourth transmission channel. The bridge circuit may output one of three signals with mutually different waveforms to the controller in accordance with the first connection status and the second connection status. The controller may switch the rotational speed of the motor main body to one of rotational speeds each associated with corresponding one of the three signals in response to the signal input from the bridge circuit. Thus, the control apparatus is able to switch the rotational speed of the motor main body to one of the three mutually different rotational speeds.

The control apparatus may further include a first Zener diode connected between the second transmission channel and the bridge circuit and a second Zener diode connected between the third transmission channel and the bridge circuit. Thus, the controller is able to distinguish signals input to the controller more reliably in accordance with the first connection status and the second connection status.

The control apparatus may further include a low-pass filter on the fourth transmission channel. Thus, the control apparatus is able to switch the rotational speed of the motor main body to any one of the three mutually different rotational speeds without detecting the waveforms of the three signals input to the controller.

The control apparatus may further include a voltage-dividing circuit on the fourth transmission channel. Thus, the control apparatus is able to suppress an increase in the manufacturing cost as compared with a case including a step-down circuit.

The control apparatus may have a configuration in which the controller includes one signal input terminal that receives a signal input to the controller, the signal input terminal being a terminal that receives an analog signal. Thus, the control apparatus is able to switch the rotational speed of the motor main body in accordance with the analog signal while suppressing an increase in the manufacturing cost.

A motor according to an example embodiment includes a motor main body and a control apparatus. The control apparatus includes a controller configured to control the motor main body, a first transmission channel connected to a first power-supply terminal of an alternating-current source that supplies an alternating-current voltage, a second transmission channel connected to a second power-supply terminal of the alternating-current source, and a third transmission channel connected to each of the first transmission channel and the second transmission channel. The controller switches the rotational speed of the motor main body based on the voltage value of a signal input to the controller in accordance with a first connection status of the first transmission channel and the third transmission channel and a second connection status of the second transmission channel and the third transmission channel. Thus, the motor is able to switch the rotational speed while suppressing an increase in the manufacturing cost.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A control apparatus comprising:
    a controller that controls a motor main body;
    a first transmission channel connected to a first power-supply terminal of an alternating-current source that supplies an alternating-current voltage;
    a second transmission channel connected to a second power-supply terminal of the alternating-current source;
    a third transmission channel connected to each of the first transmission channel and the second transmission channel; and
    a bridge circuit connected between the second transmission channel and the third transmission channel and outputting, a control signal to the controller through a fourth transmission channel; wherein
    the controller switches a rotational speed of the motor main body based on a voltage value of the control signal input to the controller from the bridge circuit in accordance with a first connection status of the first transmission channel and the third transmission channel and a second connection status of the second transmission channel and the third transmission channel;
    the control signal includes one of three mutually different waveforms which are chosen and sent to the controller in accordance with the first connection status and the second connection status; and
    the controller switches the rotational speed of the motor main body to one of rotational speeds each associated with a corresponding one of the three mutually different waveforms in response to the control signal input to the controller from the bridge circuit.

2. The control apparatus according to claim 1, further comprising:
    a first Zener diode connected between the second transmission channel and the bridge circuit; and
    a second Zener diode connected between the third transmission channel and the bridge circuit.

3. The control apparatus according to claim 1, further comprising:
    a low-pass filter in the fourth transmission channel.

4. The control apparatus according to claim 1, further comprising:
    a voltage-dividing circuit in the fourth transmission channel.

5. The control apparatus according to claim 1, wherein
    the controller includes one signal input terminal that receives the signal; and
    the signal input terminal is a terminal that receives an analog signal.

6. The control apparatus according to claim 2, further comprising:
    a low-pass filter in the fourth transmission channel.

7. The control apparatus according to claim 2, further comprising:
    a voltage-dividing circuit in the fourth transmission channel.

8. The control apparatus according to claim 3, further comprising:
    a voltage-dividing circuit in the fourth transmission channel.

9. The control apparatus according to claim 1, wherein
    the controller includes one signal input terminal that receives the signal; and
    the signal input terminal is a terminal that receives an analog signal.

10. The control apparatus according to claim 2, wherein
    the controller includes one signal input terminal that receives the signal; and
    the signal input terminal is a terminal that receives an analog signal.

11. The control apparatus according to claim 3, wherein
    the controller includes one signal input terminal that receives the signal; and
    the signal input terminal is a terminal that receives an analog signal.

12. The control apparatus according to claim 4, wherein
    the controller includes one signal input terminal that receives the signal; and
    the signal input terminal is a terminal that receives an analog signal.

13. A motor comprising:
    a motor main body; and
    a control apparatus; wherein
    the control apparatus includes:
        a controller that controls the motor main body;
        a first transmission channel connected to a first power-supply terminal of an alternating-current source that supplies an alternating-current voltage;
        a second transmission channel connected to a second power-supply terminal of the alternating-current source;
        a third transmission channel connected to each of the first transmission channel and the second transmission channel; and
        a bridge circuit connected between the second transmission channel and the third transmission channel end outputting a control signal to the controller through a fourth transmission channel;
    the controller switches a rotational speed of the motor main body based on a voltage value of the control signal input to the controller from the bridge circuit in accordance with a first connection status of the first transmission channel and the third transmission channel and a second connection status of the second transmission channel and the third transmission channel;
    the control signal includes one of three mutually different waveforms which are chosen and sent to the controller in accordance with the first connection status and the second connection status; and the controller switches the rotational speed of the motor main body to one of rotational speeds each associated with a corresponding one of the three mutually different waveforms in response to the control signal input to the controller from the bridge circuit.

* * * * *